(12) United States Patent
Kim et al.

(10) Patent No.: US 11,657,803 B1
(45) Date of Patent: May 23, 2023

(54) METHOD FOR SPEECH RECOGNITION BY USING FEEDBACK INFORMATION

(71) Applicant: ActionPower Corp., Seoul (KR)

(72) Inventors: Hyungwoo Kim, Gyeonggi-do (KR); Dongchan Shin, Seoul (KR)

(73) Assignee: ActionPower Corp., Seoul (KR)

( * ) Notice: Subject to any disclaimer, the term of this patent is extended or adjusted under 35 U.S.C. 154(b) by 0 days.

(21) Appl. No.: 17/979,709

(22) Filed: Nov. 2, 2022

(51) Int. Cl.
*G10L 15/16* (2006.01)
*G10L 15/22* (2006.01)

(52) U.S. Cl.
CPC .............. *G10L 15/16* (2013.01); *G10L 15/22* (2013.01); *G10L 2015/225* (2013.01)

(58) Field of Classification Search
None
See application file for complete search history.

(56) References Cited

U.S. PATENT DOCUMENTS

| 5,794,189 | A * | 8/1998 | Gould | G10L 15/22 |
| | | | | 704/E15.044 |
| 8,719,014 | B2 * | 5/2014 | Wagner | G10L 15/26 |
| | | | | 704/231 |
| 9,190,056 | B2 * | 11/2015 | Zhu | G10L 15/22 |
| 2007/0061152 | A1 * | 3/2007 | Doi | G10L 15/26 |
| | | | | 704/277 |
| 2009/0070109 | A1 * | 3/2009 | Didcock | G10L 15/30 |
| | | | | 704/235 |
| 2009/0326938 | A1 * | 12/2009 | Marila | G10L 15/22 |
| | | | | 704/235 |
| 2015/0348550 | A1 * | 12/2015 | Zhang | G06F 3/167 |
| | | | | 704/235 |
| 2016/0155436 | A1 * | 6/2016 | Choi | G10L 15/32 |
| | | | | 704/232 |
| 2018/0342233 | A1 * | 11/2018 | Li | G10L 15/22 |
| 2019/0005946 | A1 * | 1/2019 | Huang | G10L 15/04 |
| 2019/0035385 | A1 * | 1/2019 | Lawson | G10L 15/063 |
| 2019/0206389 | A1 * | 7/2019 | Kwon | G10L 15/075 |

(Continued)

FOREIGN PATENT DOCUMENTS

| CN | 114613361 A | 6/2022 |
| CN | 114676219 A | 6/2022 |

(Continued)

OTHER PUBLICATIONS

Korean Intellectualy Property Office issued a Notice of Allowance for Application No. 10-2022-0087494, dated Jan. 2, 2023.

(Continued)

*Primary Examiner* — Jonathan C Kim
(74) *Attorney, Agent, or Firm* — Marshall, Gerstein & Borun LLP

(57) ABSTRACT

Disclosed is a speech recognition method performed by one or more processors of a computing device, the speech recognition method including: performing first speech recognition on voice information to obtain first text information on the voice information; receiving feedback regarding the first text information; and generating final text information for the voice information based on the received feedback, in which the first speech recognition includes real-time speech recognition, and is performed through a neural network model of a first structure.

12 Claims, 9 Drawing Sheets

(56) References Cited

U.S. PATENT DOCUMENTS

| | | | | |
|---|---|---|---|---|
| 2019/0279623 A1* | 9/2019 | Liu | ............ | G10L 15/18 |
| 2019/0378507 A1* | 12/2019 | Kawano | ............ | G10L 15/24 |
| 2020/0020319 A1* | 1/2020 | Malhotra | ............ | G10L 15/26 |
| 2020/0020332 A1* | 1/2020 | Kawano | ............ | G10L 15/1815 |
| 2020/0143806 A1* | 5/2020 | Sreedhara | ............ | G06V 40/164 |
| 2020/0168212 A1* | 5/2020 | Cherepanov | ............ | G10L 15/19 |
| 2021/0074277 A1* | 3/2021 | Lewis | ............ | G06F 3/013 |
| 2021/0287663 A1* | 9/2021 | Kwon | ............ | G10L 15/07 |
| 2022/0343893 A1* | 10/2022 | Hung | ............ | G10L 15/32 |
| 2022/0383853 A1* | 12/2022 | Xu | ............ | G10L 15/1815 |

FOREIGN PATENT DOCUMENTS

| | | | |
|---|---|---|---|
| KR | 10-2010-0065317 A | 6/2010 | |
| KR | 101819459 B1 | 1/2018 | |
| KR | 10-2019-0081248 A | 7/2019 | |
| KR | 10-2019-0087832 A | 7/2019 | |
| KR | 10-2021-0071713 A | 6/2021 | |
| KR | 102331675 B1 | 11/2021 | |
| KR | 10-2022-0090171 A | 6/2022 | |

OTHER PUBLICATIONS

Korean Intellectualy Property Office issued an Office Action for Application No. 10-2022-0087494, dated Sep. 28, 2022.

\* cited by examiner

METHOD FOR SPEECH RECOGNITION BY USING FEEDBACK INFORMATION

CROSS-REFERENCE TO RELATED APPLICATIONS

This application claims priority to and the benefit of Korean Patent Application No. 10-2022-0087494 filed in the Korean Intellectual Property Office on Jul. 15, 2022, the entire contents of which are incorporated herein by reference.

TECHNICAL FIELD

The present disclosure relates to a speech recognition method by using feedback information, and more particularly, to a method of quickly providing an accurate speech recognition result by using feedback information when speech recognition is performed.

BACKGROUND

Text information obtained by the existing real-time speech recognition could quickly dictate the users' speech into text, but there was a problem that the accuracy was somewhat lowered because there was very little information referring to the context before and after.

In addition, in the existing speech recognition system, when speech recognition is performed by receiving a voice file instead of in real time, context may be considered, but it takes longer than the case of real-time speech recognition, and the accuracy is higher than that of real-time speech recognition, but there were still erroneously transcribed parts.

Therefore, there is a need for a solution for reducing the time for speech recognition while increasing the accuracy of speech recognition in consideration of context information, which has been the problem in the existing speech recognition system, and a new technology capable of solving these problems or shortcomings is required.

On the other hand, the present disclosure has been derived based on at least the technical background discussed above, but the technical problem or purpose of the present disclosure is not limited to solve the problems or disadvantages discussed above. That is, the present disclosure may cover various technical issues related to the content to be described below in addition to the technical issues discussed above.

SUMMARY

The present disclosure has been conceived in response to the foregoing background art, and has been made in an effort to quickly provide an accurate speech recognition result by using feedback information when speech recognition is performed.

On the other hand, the technical problem to be achieved by the present disclosure is not limited to the technical problem mentioned above, and various technical problems may be included within the range obvious to those skilled in the art from the content to be described below.

In order to solve the foregoing object, an exemplary embodiment of the present disclosure discloses a speech recognition method performed by a computing device, the speech recognition method including: performing first speech recognition on voice information to obtain first text information on the voice information; receiving feedback regarding the first text information; and generating final text information for the voice information based on the received feedback, in which the first speech recognition includes real-time speech recognition, and is performed through a neural network model of a first structure.

Alternatively, the received feedback may include feedback on an incorrect text and corrected text information for the first text information, and the generating of the final text information may include generating the final text information based on the first text information and the corrected text information.

Alternatively, the generating of the final text information for the voice information may include performing second speech recognition on the voice information based on the received feedback to generate the final text information, the second speech recognition may be performed by a neural network model of a second structure, and the neural network model of the second structure may be different from the neural network model of the first structure.

Alternatively, the neural network model of the first structure may be a Real-Time Speech-To-Text (RT-STT) neural network model including a transducer structure, and the neural network model of the second structure may be a Speech-To-Text (STT) neural network model including an encoder and decoder structure.

Alternatively, the feedback regarding the first text information may include at least one of feedback on a correct text of the first text information and incorrect feedback regarding the first text information, and the feedback on an incorrect text of the first text information may include corrected text information on the first text information.

Alternatively, the feedback on the correct text of regarding the first text information may include feedback indicating that text information for a specific section of the voice information is correctly generated, and the feedback on the incorrect text of regarding the first text information may include feedback indicating that text information for a specific section of the voice information is incorrectly generated.

Alternatively, the receiving of the feedback for the first text information may include: storing time stamp information of the text for which the feedback is received in the first text information; and detecting a section corresponding to a section in which feedback is received in the voice information based on the time stamp information.

Alternatively, the storing of the time stamp information of the text for which the feedback is received in the first text information may include storing time stamp information for times corresponding to a start and an end of the text for which the feedback is received among the first text information, and the detecting of the section corresponding to the section in which the feedback is received in the voice information based on the time stamp information may include detecting a section corresponding to times corresponding to a start and an end of the text in which the feedback is received in the voice information.

Alternatively, the generating of the final text information by performing the second speech recognition on the voice information based on the received feedback may include: outputting a result according to a type of feedback for a section corresponding to the section in which feedback is received in the voice information; and outputting second text information by performing the second speech recognition on a section other than the section corresponding to the section in which the feedback is received in the voice information.

Alternatively, the outputting of the result according to the type of feedback for the section corresponding to the section in which the feedback is received in the voice information may include: outputting the first text information for the section corresponding to the section in which feedback is received in the voice information when the type of feedback is feedback on a correct text; and outputting corrected text information about the first text information for the section corresponding to the section in which the feedback is received in the voice information when the type of the feedback is feedback on an incorrect text.

Alternatively, the generating of the final text information by performing the second speech recognition on the voice information based on the received feedback may include: the generating of second text information by performing the second speech recognition on an entire section of the voice information; and correcting the second text information for the section corresponding to the section in which feedback is received in the voice information.

Alternatively, the correcting of the second text information for the section corresponding to the section in which feedback is received in the voice information may include: converting the second text information into the first text information for the section corresponding to the section in which the feedback is received in the voice information when the type of the feedback is feedback on a correct text; and converting the second text information into corrected text information on the first text information for the section corresponding to the section in which the feedback is received in the voice information when the type of the feedback is feedback on an incorrect text.

In order to implement the foregoing object, another exemplary embodiment of the present disclosure discloses a computer program stored in a computer readable storage medium. When the computer program is executed by one or more processors, the computer program causes the one or more processors to perform operations for speech recognition, the operation including: obtaining first text information for voice information by performing first speech recognition on the voice information; receiving feedback regarding the first text information; and generating final text information for the voice information based on the received feedback, in which the first speech recognition includes real-time speech recognition, and is performed through a neural network model of a first structure.

In order to implement the foregoing object, another exemplary embodiment of the present disclosure discloses a computing device, including: at least one processor; and a memory, in which the processor obtains first text information for voice information by performing first speech recognition on the voice information, receives feedback regarding the first text information; and generates final text information on the voice information based on the received feedback, in which the first speech recognition includes real-time speech recognition and is performed through a neural network model of a first structure.

The present disclosure may provide the speech recognition method, and through this, it is possible to rapidly provide an accurate result of speech recognition by using feedback information when the speech recognition is performed.

DETAILED DESCRIPTION

Figure 1:
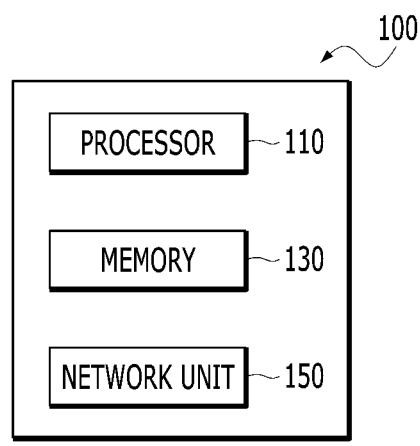
FIG. 1 is a block diagram illustrating a computing device for performing speech recognition according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram illustrating a computing device for performing speech recognition according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

The processor 110 according to the exemplary embodiment of the present disclosure may perform operations of recognizing voice information to perform speech recognition, performing speech recognition on the voice information to obtain text information, and receiving feedback regarding the obtained text information. In this case, the voice information may be information about daily life, interview, or real-time voice data or information about a voice extracted from an image.

According to the exemplary embodiment of the present disclosure, the processor 110 may generate final text information for the voice information based on the received feedback. Also, the processor 110 may obtain a speech recognition result in which the feedback information is reflected for voice information by generating final text information for the voice information.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to an exemplary embodiment of the present disclosure may use an arbitrary type known wired/wireless communication systems.

For example, the network unit 150 may receive voice information or feedback information from an external system. In this case, the information received from the database may be data for obtaining text information by performing speech recognition on the voice information or data for generating final text information for the voice information based on feedback. The voice information may include the information of the above-described examples, but is not limited to the above-described examples, and may be variously configured within a range that a person skilled in the art can understand.

The network unit 150 may transmit and receive information processed by the processor 110, a user interface, etc., through communication with the other terminal. For example, the network unit 150 may provide the user interface generated by the processor 110 to a client (e.g., a user terminal). Further, the network unit 150 may receive an external input of a user applied to the client and deliver the received external input to the processor 110. In this case, the processor 110 may process operations such as output, modification, change, addition, etc., of information provided through the user interface based on the external input of the user delivered from the network unit 150. In the meantime, the computing device 100 according to the exemplary embodiment of the present disclosure is a computing system which transmits and receives information with the client, by means of communication and includes a server. At this time, the client may be an arbitrary form of a terminal accessible to the server. For example, the computing device 100, which is a server, may receive information for performing speech recognition using feedback information from an external database, generate a speech recognition result, and provide a user terminal with a user interface regarding the speech recognition result. At this time, the user terminal outputs the user interface received from the computing device 100 which is a server and receives or processes the information by means of the interaction with the user.

In an additional exemplary embodiment, the computing device 100 may also include any type of terminal that performs additional information processing by receiving a data resource generated in any server.

Figure 2:
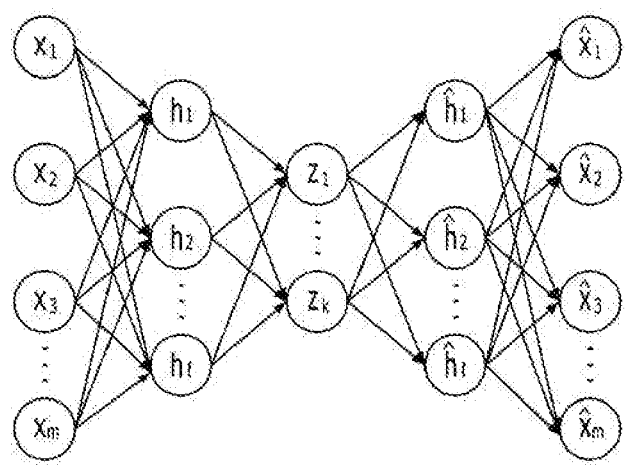
FIG. 2 is a schematic diagram illustrating a network function according to an exemplary embodiment of the present disclosure.

FIG. 2 is a schematic diagram illustrating a network function according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

Figure 3:
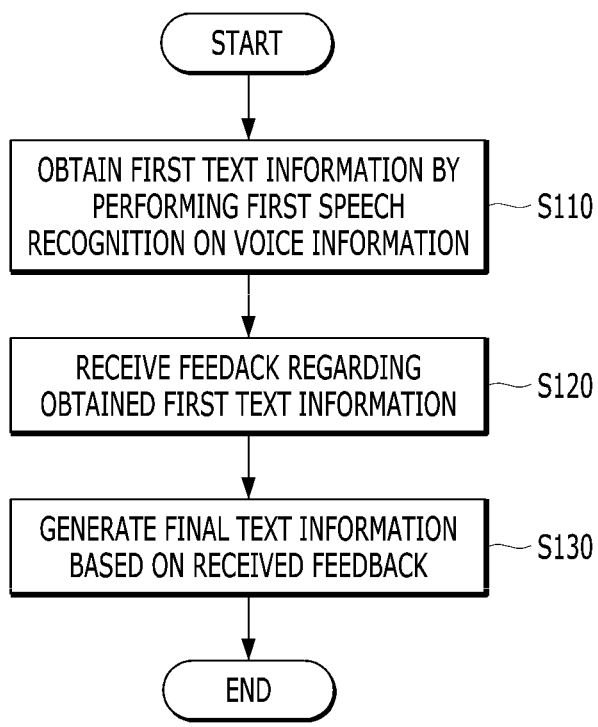
FIG. 3 is a flowchart illustrating a method of performing speech recognition by using feedback information according to an exemplary embodiment of the present disclosure.

FIG. 3 is a flowchart illustrating a method of performing speech recognition by using feedback information according to an exemplary embodiment of the present disclosure.

The computing device 100 according to the exemplary embodiment of the present disclosure may directly obtain "voice information for performing speech recognition by using feedback information" or receive "voice information for performing speech recognition by using feedback information" from an external system. The external system may be a server, a database, or the like that stores and manages evaluation target sentences. The computing device 100 may use the voice information directly obtained or received from the external system as "input data for performing speech recognition by using feedback information".

The computing device 100 may perform first speech recognition on voice information to obtain first text information (S110). For example, the computing device 100 may perform first speech recognition through a neural network model of a first structure, and in this case, the neural network model of the first structure may be a Real-Time Speech-To-Text (RT-STT) neural network model including a transducer structure, and the first speech recognition includes real-time speech recognition.

The computing device 100 may receive feedback regarding the first text information obtained through operation S110 (S120). For example, the feedback may include feedback information of the user for the text output as a result of the real-time speech recognition. In addition, the feedback regarding the first text information may include at least one of feedback on a correct text of the first text information and feedback on an incorrect text of the first text information, and the feedback on the incorrect text of the first text information may include corrected text information on the first text information. Specifically, the feedback on the correct text of the first text information may include feedback that text information for a specific section of the voice information is correctly generated, and the feedback on an incorrect text of the first text information may include feedback that text information for a specific section of the voice information is incorrectly generated. For example, when the user clicks or hovers on a specific word among a plurality of words of the first text, an interface for selecting whether the corresponding specific word is correctly or incorrectly generated may be provided to the user. When the user clicks the UI indicating that the corresponding specific word was correctly generated, feedback on a correct text may be transmitted to the computing device 100, and when the user clicks the UI indicating that the specific word was generated incorrectly and enters the corrected text information, feedback on an incorrect text including the corrected text information may be transmitted to the computing device 100. In this case, a draft result of the real-time speech recognition may be provided to the user, and the user's experience may be improved by reflecting the user's feedback obtained from the result and performing speech recognition.

When the feedback regarding the first text information is received, the computing device 100 may store time stamp information corresponding to the text for which the feedback has been received among the first text information, and a section corresponding to the section in which the feedback is received may be detected in the voice information based on the time stamp information. Specifically, the computing device 100 may store time stamp information for times corresponding to a start and an end of the text for which the feedback is received, and detect a section corresponding to the times corresponding to the start and the end of the text for which the feedback is received from the voice information based on the time stamp information.

As an example, the computing device 100 may receive user feedback for specific text among the first text information generated as a result of the first speech recognition (for example, the RT-STT), and store time stamp information corresponding to the corresponding specific text. For example, the computing device 100 stores time stamp information (03:07~03:12) corresponding to the start and the end of the specific text among the 12 minutes and 27 second full voice file (00:00 to 12:27) generated as a result of the first speech recognition, and based on the time stamp information, a section corresponding to the text for which the feedback is received may be detected in the voice information.

The computing device 100 may generate final text information based on the feedback received in operation S120 (S130). In this case, when the received feedback is feedback on an incorrect text, the computing device 100 may generate the final text information based on the first text information and the corrected text information.

Also, according to another exemplary embodiment of the present disclosure, the computing device 100 may generate the final text information by performing second speech recognition on the voice information based on the received feedback. For example, the computing device 100 may generate the final text information by performing second speech recognition through a neural network model of a second structure different from the neural network model of the first structure, and in this case, the neural network model of the second structure may be a Speech-To-Text (STT) neural network model including an encoder and a decoder structure. In addition, according to the exemplary embodiment of the present disclosure, the computing device 100 may output a result according to the type of feedback for a section corresponding to the section in which feedback is received in the voice information, and output second text information by performing the second speech recognition on a section other than the section corresponding to the section in which the feedback is received in the voice information, and generate final text information. Specifically, when the type of feedback is feedback on a correct text, the computing device 100 may output the first text information for the section corresponding to the section in which feedback is received in the voice information, and when the type of feedback is feedback on an incorrect text, the computing device 100 may output corrected text information regarding the first text information for the section corresponding to the section in which feedback is received in the voice information. In addition, since the user's feedback is reflected when the speech recognition is performed and thus the final text information is generated, the accuracy of the result may be improved compared to the case of general speech recognition.

According to another exemplary embodiment of the present disclosure, the computing device 100 may generate second text information by performing the second speech recognition on the entire section of the voice information, and for a section corresponding to the section in which feedback is received in the voice information, the computing device 100 may generate final text information by correcting the second text information. Specifically, when the type of feedback is feedback on the correct text, the computing device 100 may convert the second text information into the first text information for the section corresponding to the section in which the feedback is received in the voice information, and when the type of feedback is feedback on the incorrect text, the computing device 100 may convert the second text information into corrected text information for the first text information for the section corresponding to the section in which the feedback is received in the voice information. Among the exemplary embodiments of the present disclosure, the exemplary embodiment in which feedback is directly reflected when the second speech recognition is performed will be described in detail below with reference to FIGS. 4 to 6.

Figure 4:
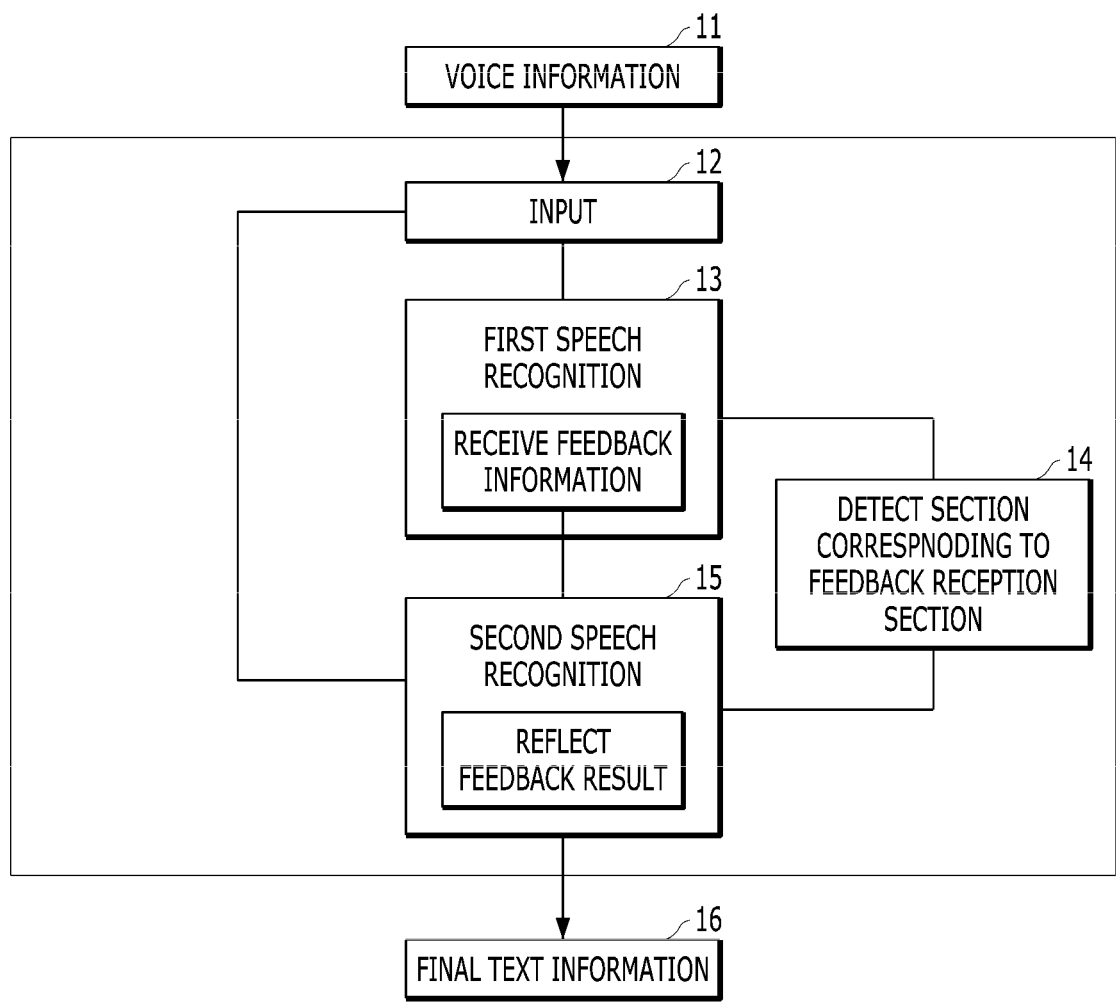
FIG. 4 is a schematic diagram illustrating an exemplary embodiment in which feedback is directly reflected when a second speech recognition is performed among exemplary embodiments of the present disclosure.

FIG. 4 is a schematic diagram illustrating an exemplary embodiment in which feedback is directly reflected when the second speech recognition is performed among exemplary embodiments of the present disclosure.

Referring to FIG. 4, the computing device 100 according to the exemplary embodiment of the present disclosure may use voice information 11 directly obtained or received from an external system as input data 12 for performing speech recognition by using feedback.

In this case, the voice information 11 may include audio information about daily conversation, audio information about an interview, or audio information about real-time voice, and various audio information may be included in addition to these examples.

The computing device 100 may perform first speech recognition on the input voice information, obtain first text information on the voice information, and receive feedback information on the first text information (13). When the feedback information is received, the computing device 100 may detect a section corresponding to the section in which the feedback is received (14), and the detected corresponding section and the received feedback information may be reflected when the second speech recognition is performed (15). Accordingly, since the feedback result is reflected when the second speech recognition is performed, the final result text may be output without separately performing the second speech recognition for the section in which the feedback is received (16). A detailed process in which feedback is directly reflected when the second speech recognition is performed will be described below with reference to FIG. 5.

Figure 5:
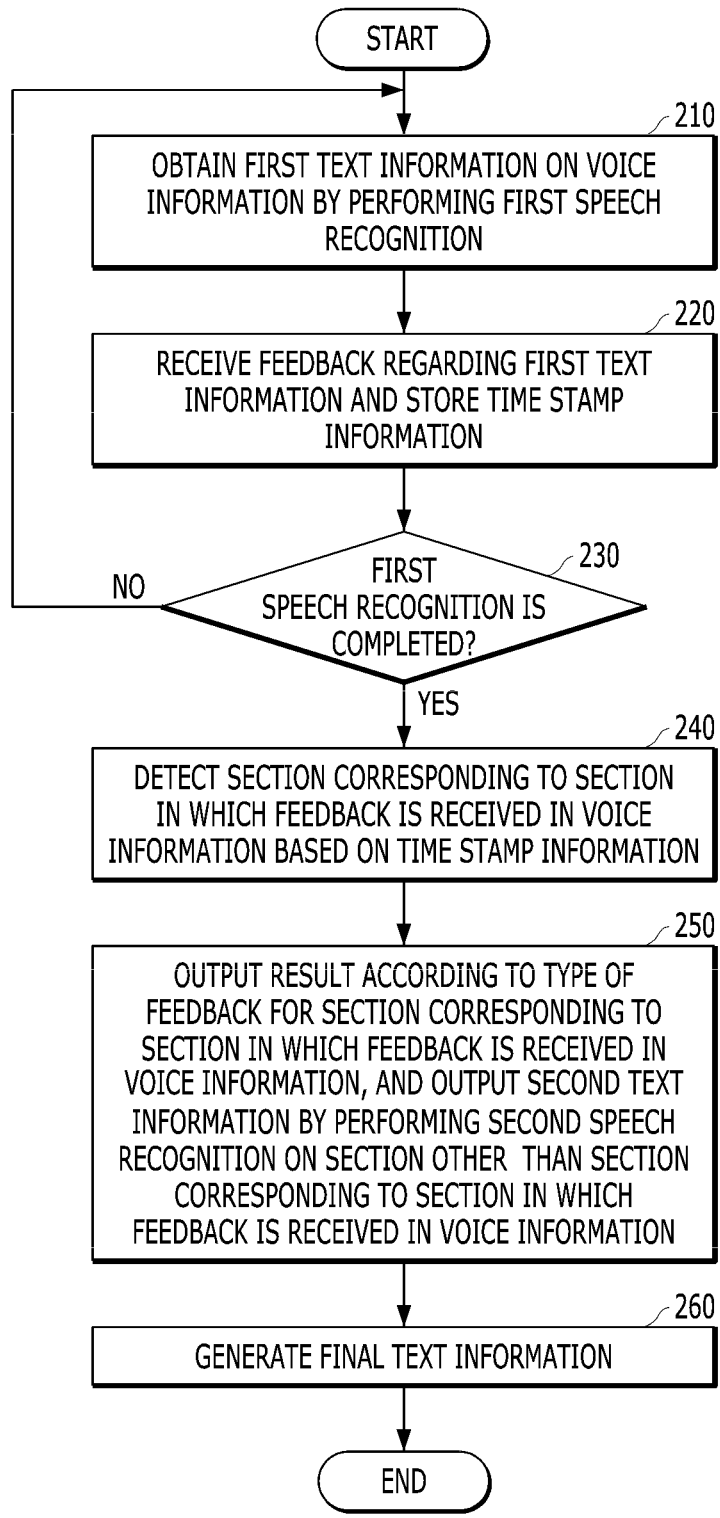
FIG. 5 is an algorithm flowchart for explaining an exemplary embodiment in which feedback is directly reflected when a second speech recognition is performed among exemplary embodiments of the present disclosure.

FIG. 5 is an algorithm flowchart for explaining an exemplary embodiment in which feedback is directly reflected when the second speech recognition is performed among the exemplary embodiments of the present disclosure.

According to the exemplary embodiment of the present disclosure, the computing device 100 may perform first speech recognition to obtain first text information on the voice information (210). For example, the first speech recognition may be performed as real-time speech recognition by using a Real-Time Speech-To-Text (RT-STT) neural network model including a transducer structure. Accordingly, first text information may be obtained, and the first text information may include result text information for real-time speech recognition.

The computing device 100 may receive the feedback regarding the first text information obtained in operation 210 and store time stamp information (220). For example, the feedback may include feedback information input by a user for first text information that is a result of the real-time speech recognition. Specifically, for "the accurately transcribed part in the result text for the real-time speech recognition", a feedback on a correct text indicating that text information for the specific section was correctly generated may be input and for "the part that is not accurately transcribed in the result text for the real-time speech recognition", "feedback on an incorrect text indicating that text information for the specific section was not correctly generated" and "correctly corrected text information for text on an incorrect text" may be input. Also, the computing device 100 may store time stamp information of the text for which the feedback is received among the first text information. The stored time stamp information may be utilized when the section corresponding to the section in which feedback is received is detected in the voice information in operation 240 below. A detailed process will be described in operation 240 below.

The computing device 100 may determine whether the first speech recognition for the voice information is completed (230). Specifically, when it is determined that the first speech recognition is not completed, the computing device 100 may additionally perform operations 210 and 220. On the other hand, when it is determined that the first speech recognition is completed, the next operation for generating final text information by using the feedback information may be executed.

The computing device 100 may detect a section corresponding to the section in which the feedback is received in the voice information based on the time stamp information stored in operation 220 (240). For example, the computing device 100 may store time stamp information for times corresponding to the start and the end of the text for which the feedback is received in the first text information, and detect a section corresponding to the times corresponding to the start and the end of the text for which the feedback is received in the voice information based on the stored time stamp information. Through this, it is possible to accurately identify a specific section to which the feedback is input among all sections of the voice information.

The computing device 100 may output a result according to the type of feedback for the "section corresponding to the section in which the feedback is received in the voice information" detected in operation 240, and perform second speech recognition on a section other than the section corresponding to the section in which the feedback is received in the voice information and output second text information (250). In this case, the second speech recognition may be performed by using a Speech-To-Text (STT) neural network model including an encoder and decoder structure. Also, the computing device 100 may generate final text information, which is a result of the speech recognition, based on the second text information output in operation 250 and the result according to the type of feedback (260). A detailed process of generating the final text information by reflecting the feedback result through operation 250 will be described below with reference to FIG. 6.

Figure 6:
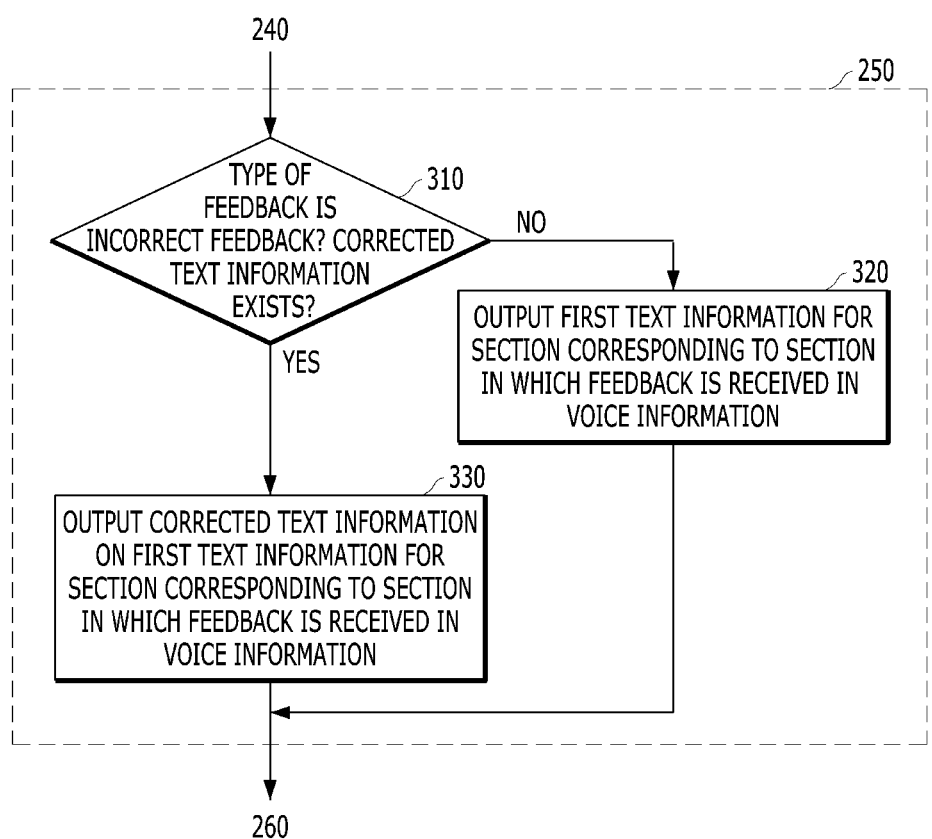
FIG. 6 is an algorithm flowchart for explaining a process of outputting a result according to a type of feedback in the exemplary embodiment in which feedback is directly reflected when second speech recognition is performed among exemplary embodiments of the present disclosure.

FIG. 6 is an algorithm flowchart for explaining a process of outputting a result according to a type of feedback in the exemplary embodiment in which feedback is directly reflected when second speech recognition is performed among the exemplary embodiments of the present disclosure.

According to the exemplary embodiment of the present disclosure, the computing device 100 may determine whether the feedback received for the "section corresponding to the section in which the feedback is received in the voice information" detected in operation 240 is feedback on an incorrect text, and whether corrected text information exists (310). Specifically, when it is determined that the received feedback is not feedback on the incorrect text (that is, correct text), the computing device 100 may output first text information without need to perform the second speech recognition for the "section corresponding to the section in which the feedback is received in the voice information" detected in operation 240 (320). On the other hand, when it is determined that the received feedback is feedback on the incorrect text and the corrected text information exists, the computing device 100 may output corrected text information for the first text information without the need to perform the second speech recognition for the "section corresponding to the section in which the feedback is received in the voice information" detected in operation 240 (330). Through this, when the second speech recognition is performed, the computing device 100 may generate final text information by reflecting the feedback information for the section in which the feedback information exists and outputting text.

Additionally, several exemplary embodiments of the present disclosure utilizing the received feedback are disclosed.

First, according to another exemplary embodiment of the present disclosure, when the received feedback is feedback on an incorrect text and the corrected text information exists, the computing device 100 may add the correction text to the user dictionary of the corresponding account as a keyword, and the correction text may be utilized for keyword boosting in the later transcription in the corresponding account based on the added correction text. Keyword boosting refers to a technology that receives a list of keywords that a user wants to recognize as an input, and increases the probability of a word included in the keyword list in a decoding process, so that the word is recognized as the corresponding word, and for example, the keyword boosting includes a tree-based keyword boosting method. Through this, when the computing device 100 performs speech recognition on the speech of the same user later, the priority of the correction text may be increased during beam-search of the decoding process.

According to another exemplary embodiment of the present disclosure, due to the user's feedback (the feedback on the correct text or the feedback on the incorrect text), there is a pair of correct text (the first text in case of the feedback on the correct text and the correction text for the first text in case of the feedback on the incorrect text) corresponding to the user's speech, and the computing device 100 may separately store the pair in a database and utilize the stored pair when a customized speech recognition model for each user account is trained.

An exemplary embodiment in which feedback is reflected after the second speech recognition has been completely performed according to another exemplary embodiment of the present disclosure will be described in detail below with reference to FIGS. 7 to 9.

Figure 7:
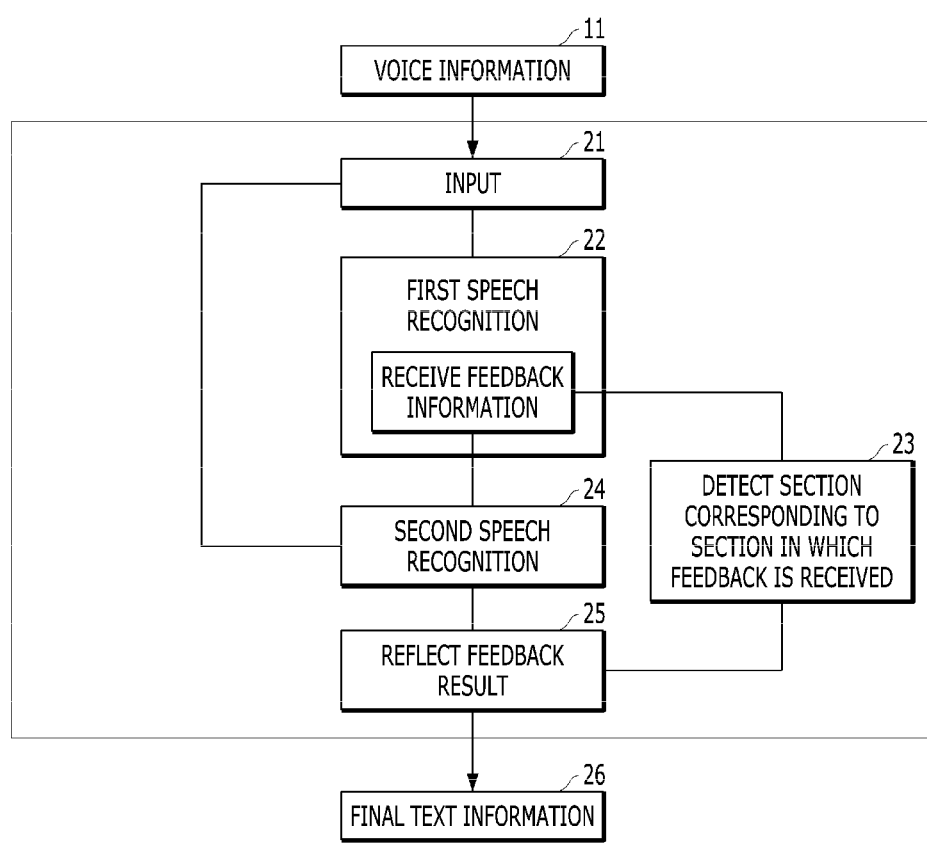
FIG. 7 is a schematic diagram illustrating an exemplary embodiment in which feedback is reflected after second speech recognition is completely performed among exemplary embodiments of the present disclosure.

FIG. 7 is a schematic diagram illustrating an exemplary embodiment in which feedback is reflected after the second speech recognition is completely performed among exemplary embodiments of the present disclosure.

Referring to FIG. 7, the computing device 100 according to the exemplary embodiment of the present disclosure may use the voice information 11 directly obtained or received from the external system as input data 21 for performing speech recognition by using feedback.

In this case, the voice information 11 may include audio information about daily conversation, audio information about an interview, or audio information about real-time voice, and various audio information may be included in addition to these examples.

The computing device 100 may perform first speech recognition on the input voice information 11, obtain first text information on the voice information, and receive feedback information on the first text information (22). When the feedback information is received, the computing device 100 may detect a section corresponding to the section in which the feedback is received (23), and the detected corresponding section and the received feedback information may be reflected when the final text information is generated (25) after the second speech recognition is performed (24). Accordingly, since the feedback result is reflected after the second speech recognition is performed, the feedback may be reflected through post-processing for the result text separately from the second speech recognition. A detailed process in which the feedback is reflected after the second speech recognition is completely performed will be described below with reference to FIG. 8.

Figure 8:
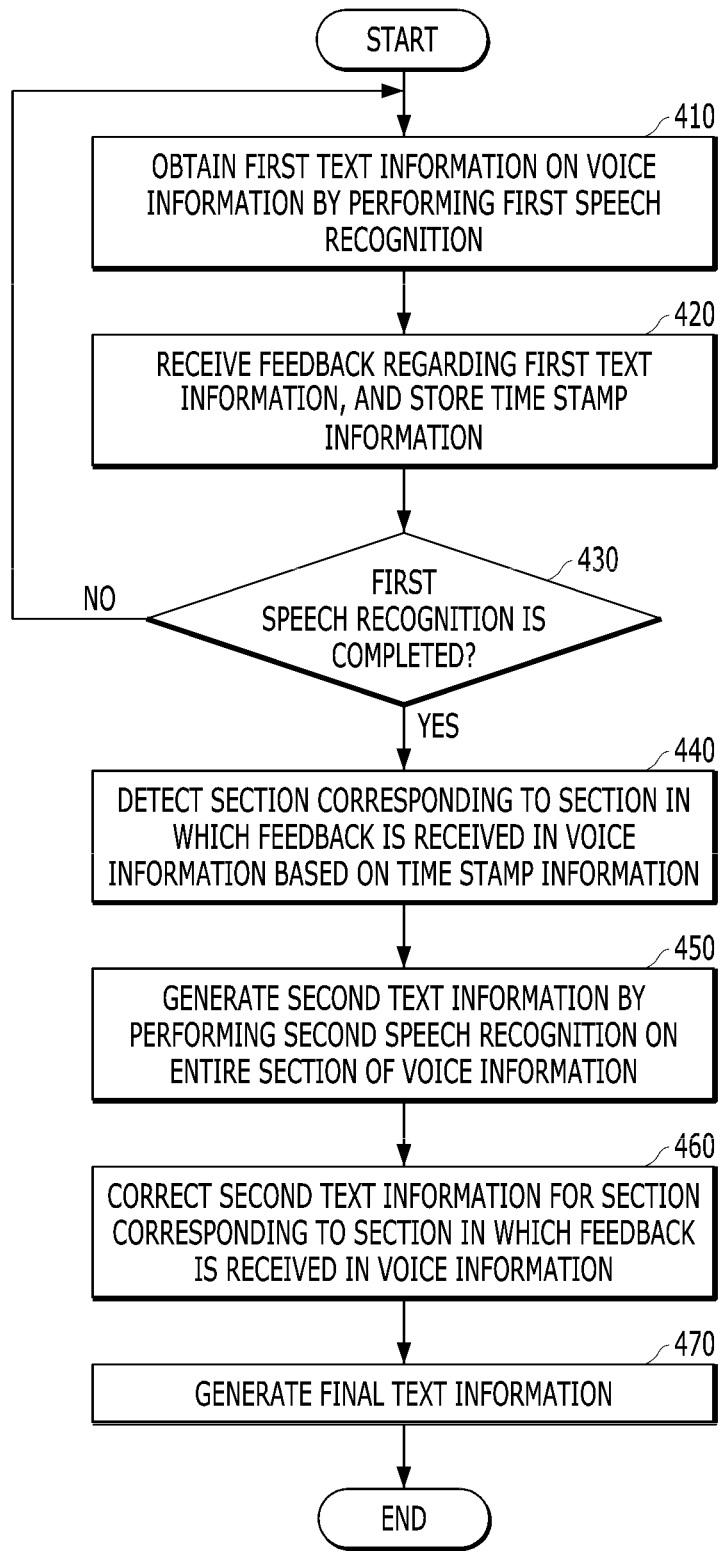
FIG. 8 is an algorithm flowchart for explaining an exemplary embodiment in which feedback is reflected after second speech recognition is completely performed among exemplary embodiments of the present disclosure.

FIG. 8 is an algorithm flowchart for explaining an exemplary embodiment in which feedback is reflected after the second speech recognition is completely performed among the exemplary embodiments of the present disclosure.

According to the exemplary embodiment of the present disclosure, the computing device 100 may perform first speech recognition to obtain first text information on the voice information (410). For example, the first speech recognition may be performed as real-time speech recognition by using an RT-STT neural network model including a transducer structure. Accordingly, first text information may be obtained, and the first text information may include result text information for real-time speech recognition.

The computing device 100 may receive the feedback regarding the first text information obtained in operation 410 and store time stamp information (420). For example, the feedback may include feedback information input by a user for the result text information for the real-time speech recognition. Specifically, for "the accurately transcribed part in the result text for the real-time speech recognition", a feedback on a correct text indicating that text information for the specific section was correctly generated may be input and for "the part that is not accurately transcribed in the result text for the real-time speech recognition", "feedback on an incorrect text indicating that text information for the specific section was not correctly generated" and "correctly corrected text information for incorrect text" may be input. Also, the computing device 100 may store time stamp information corresponding to the text for which the feedback is received in the first text information. The stored time stamp information may be utilized when a section corresponding to the section in which feedback is received is detected in the voice information in operation 440. A detailed process will be described in operation 440 below.

The computing device 100 may determine whether the first speech recognition for the voice information is completed (430). Specifically, when it is determined that the first speech recognition is not completed, the computing device 100 may additionally perform operations 410 and 420. On the other hand, when it is determined that the first speech recognition is completed, the next operation for generating final text information by using the feedback information may be executed.

The computing device 100 may detect a section corresponding to the section in which feedback is received in the voice information based on the time stamp information stored in operation 420 (440). For example, the computing device 100 may store time stamp information for times corresponding to a start and an end of the text for which the feedback is received, and detect a section corresponding to the times corresponding to the start and the end of the text for which the feedback is received in the voice information based on the time stamp information. Through this, it is possible to accurately identify a specific section to which the feedback is input among all sections of the voice information.

The computing device 100 may generate second text information by performing second speech recognition on the entire section of the voice information (450). In this case, the second speech recognition may be performed by using an STT neural network model including an encoder and decoder structure.

The computing device 100 may correct the second text information for "the section corresponding to the section in which feedback is received in the voice information" detected in operation 440 (460). Also, the computing device 100 may generate final text information based on the second text information corrected in operation 460 (470). A detailed process of generating the final text information by correcting the second text information in operation 460 will be described below with reference to FIG. 9.

Figure 9:
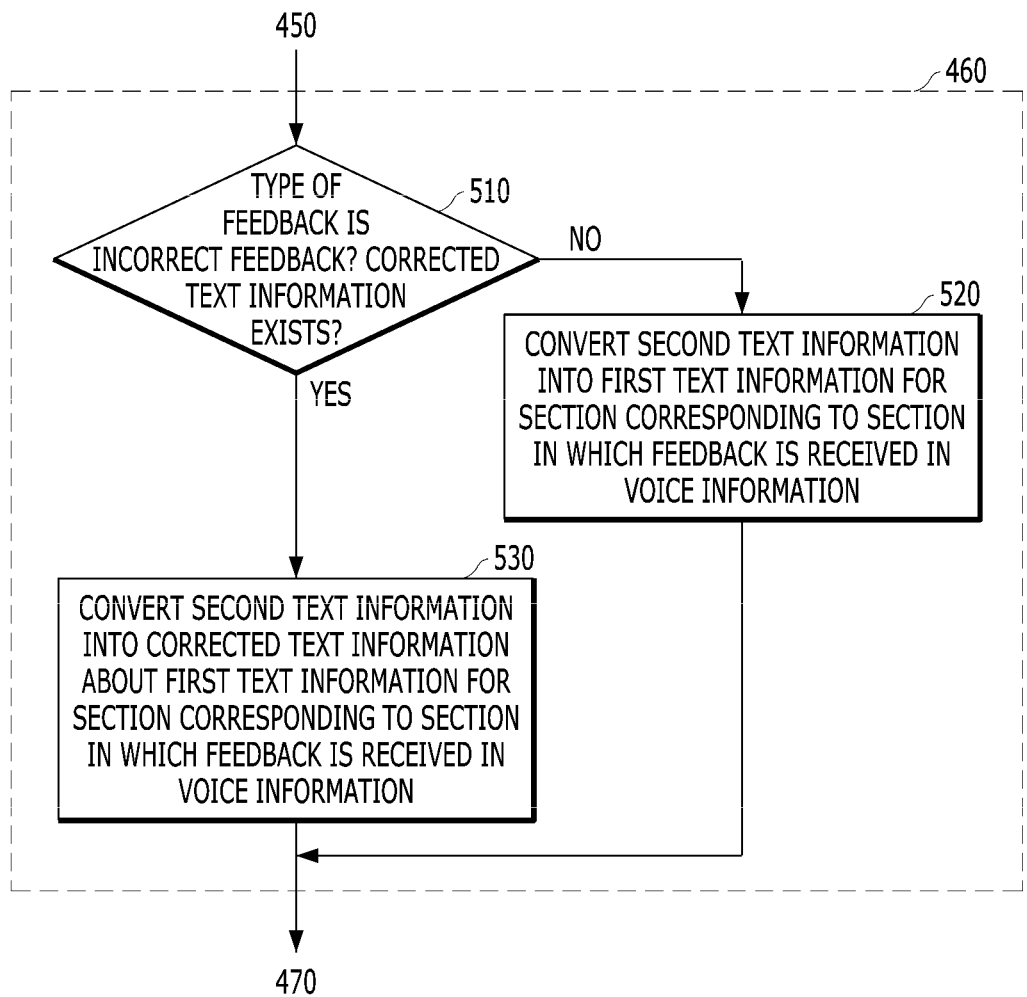
FIG. 9 is an algorithm flowchart for explaining a process in which second text is corrected according to a type of feedback in an exemplary embodiment in which feedback is reflected after second speech recognition is completely performed among exemplary embodiments of the present disclosure.

FIG. 9 is an algorithm flowchart for explaining a process in which second text is corrected according to the type of feedback in an exemplary embodiment in which the feedback is reflected after the second speech recognition is completely performed among exemplary embodiments of the present disclosure.

According to the exemplary embodiment of the present disclosure, the computing device 100 may determine whether the feedback received for the "section corresponding to the section in which the feedback is received in the voice information" detected in operation 440 is feedback on the incorrect text, and whether corrected text information exists (510). Specifically, when it is determined that the received feedback is not feedback on the incorrect text (that is, correct text), the computing device 100 may convert the second text information into first text information for the "section corresponding to the section in which the feedback is received in the voice information" detected in operation 440 (520). On the other hand, when it is determined that the received feedback is feedback on the incorrect text and the corrected text information exists, the computing device 100 may convert the second text information into the corrected text information for the first text information for the "section corresponding to the section in which the feedback is received in the voice information" detected in operation 440 (530). Through this, the computing device 100 may generate the final text information by reflecting the feedback information and outputting text for the section in which feedback information exists among "the second text, which is a result of the second speech recognition for the entire section of voice information".

Disclosed is a computer readable medium storing the data structure according to an exemplary embodiment of the present disclosure. The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection relationship between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an effectively designed data structure, a computing device can perform operations while using the resources of the computing device to a minimum. Specifically, the computing device can increase the efficiency of operation, read, insert, delete, compare, exchange, and search through the effectively designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The deque may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

Throughout the present specification, a computation model, the neural network, a network function, and the neural network may be used as the same meaning. Hereinafter, the computation model, the neural network, the network function, and the neural network will be integrated and described as the neural network. The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for learning the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for learning the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called nodes. The nodes may also be called neurons. The neural network is configured to include one or more nodes.

The data structure may include data input into the neural network. The data structure including the data input into the neural network may be stored in the computer readable medium. The data input to the neural network may include learning data input in a neural network learning process and/or input data input to a neural network in which learning is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include the weight of the neural network (in the present disclosure, the weight and the parameter may be used as the same meaning). In addition, the data structures, including the weight of the neural network, may be stored in the computer readable medium. The neural network may include a plurality of weights. The weight may be variable and the weight is variable by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network learning process and/or a weight in which neural network learning is completed. The weight which varies in the neural network learning process may include a weight at a time when a learning cycle starts and/or a weight that varies during the learning cycle. The weight in which the neural network learning is completed may include a weight in which the learning cycle is completed. Accordingly, the data structure including the weight of the neural network may include a data structure including the weight which varies in the neural network learning process and/or the weight in which neural network learning is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of learning cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

Figure 10:
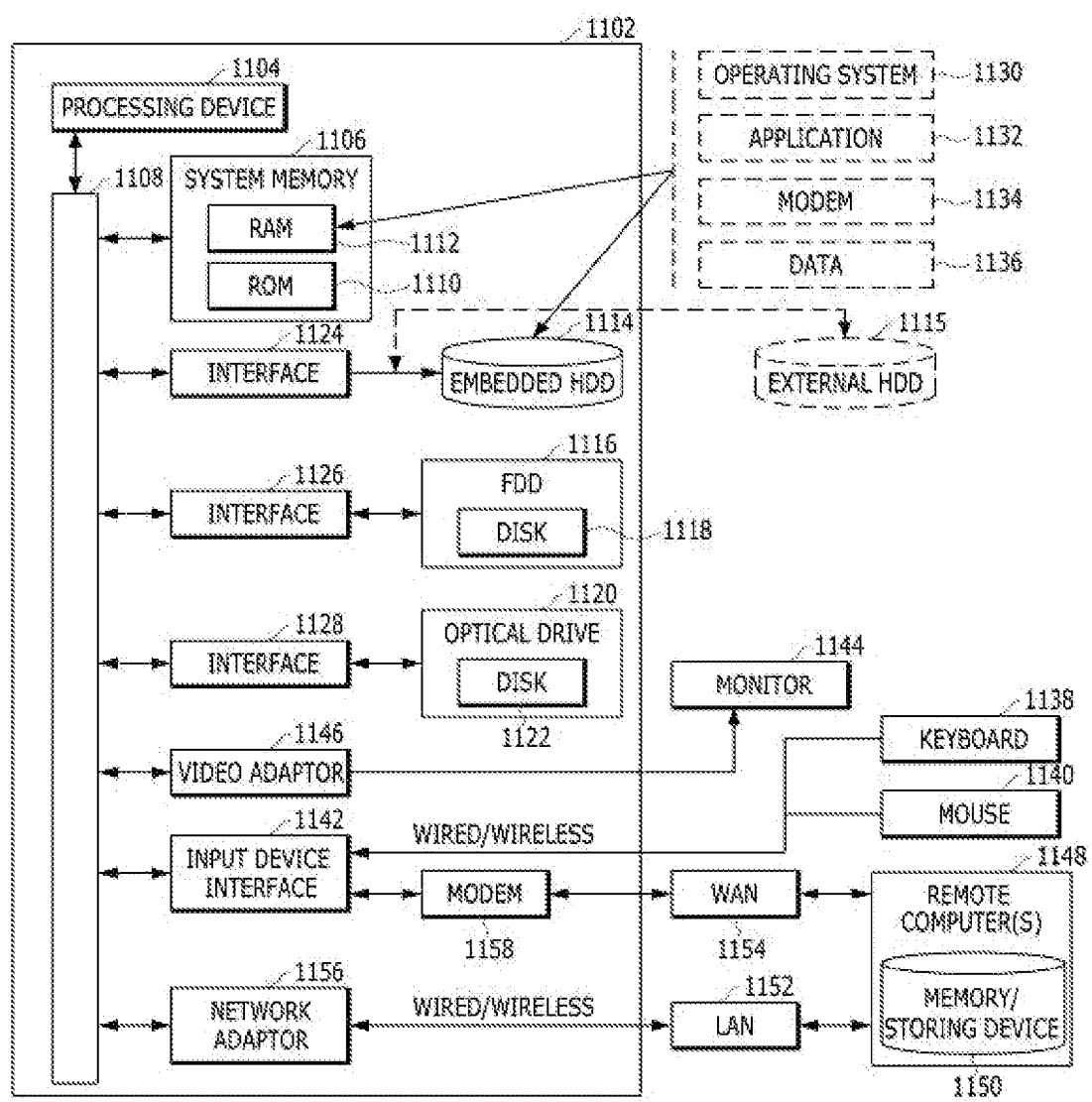
FIG. 10 is a simple and general schematic diagram illustrating an example of a computing environment in which several exemplary embodiments of the present disclosure are implementable.

FIG. 10 is a normal and schematic view of an exemplary computing environment in which the exemplary embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting.

The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as software), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various exemplary embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

What is claimed is:

1. A speech recognition method performed by a computing device, the speech recognition method comprising:
    performing first speech recognition on voice information to obtain first text information on the voice information;
    receiving feedback regarding the first text information; and
    generating final text information for the voice information based on the received feedback,
    wherein the first speech recognition includes real-time speech recognition, and is performed through a first neural network model that is a Real-Time Speech-To-Text (RT-STT) neural network model including a transducer structure,
    wherein the feedback regarding the first text information includes at least one of: feedback on a correct text of the first text information and feedback on an incorrect text of the first text information,
    wherein the generating of the final text information for the voice information includes:
        generating the final text information by performing second speech recognition on the voice information when the received feedback is an incorrect feedback,
    and wherein the second speech recognition is performed by a second neural network model that is a Speech-To-Text (STT) neural network model including an encoder and decoder structure.

2. The speech recognition method of claim 1, wherein the received feedback includes feedback on an incorrect text and corrected text information for the first text information, and
    the generating of the final text information includes generating the final text information based on the first text information and the corrected text information.

3. The speech recognition method of claim 1,
    wherein the feedback on the incorrect text of the first text information includes corrected text information on the first text information.

4. The speech recognition method of claim 1, wherein the feedback on the correct text of the first text information includes feedback indicating that text information for a specific section of the voice information is correctly generated, and
    the feedback on the incorrect text of the first text information includes feedback indicating that text information for a specific section of the voice information is incorrectly generated.

5. The speech recognition method of claim 1, wherein the receiving of the feedback for the first text information includes:
    storing time stamp information of the text for which the feedback is received in the first text information; and
    detecting a section corresponding to a section in which feedback is received in the voice information based on the time stamp information.

6. The speech recognition method of claim 5, wherein the storing of the time stamp information of the text for which the feedback is received in the first text information includes storing time stamp information for times corresponding to a start and an end of the text for which the feedback is received among the first text information, and
    the detecting of the section corresponding to the section in which the feedback is received in the voice information based on the time stamp information includes detecting a section corresponding to times corresponding to a start and an end of the text in which the feedback is received in the voice information.

7. The speech recognition method of claim 1, wherein the generating of the final text information by performing the second speech recognition on the voice information when the received feedback is the incorrect feedback includes:
    outputting a result according to a type of feedback for a section corresponding to a section in which feedback is received in the voice information; and
    outputting second text information by performing the second speech recognition on a section other than the section corresponding to the section in which the feedback is received in the voice information.

8. The speech recognition method of claim 7, wherein the outputting of the result according to the type of feedback for the section corresponding to the section in which the feedback is received in the voice information includes:
    outputting the first text information for the section corresponding to the section in which feedback is received in the voice information when the type of feedback is feedback on a correct text; and
    outputting corrected text information about the first text information for the section corresponding to the section in which the feedback is received in the voice information when the type of the feedback is feedback on an incorrect text.

9. The speech recognition method of claim 1, wherein the generating of the final text information by performing the second speech recognition on the voice information when the received feedback is the incorrect feedback includes:
    generating second text information by performing the second speech recognition on an entire section of the voice information; and
    correcting the second text information for a section corresponding to a section in which feedback is received in the voice information.

10. The speech recognition method of claim 9, wherein the correcting of the second text information for the section corresponding to the section in which feedback is received in the voice information includes:
    converting the second text information into the first text information for the section corresponding to the section in which the feedback is received in the voice information when the type of the feedback is feedback on a correct text; and
    converting the second text information into corrected text information on the first text information for the section corresponding to the section in which the feedback is received in the voice information when the type of the feedback is feedback on an incorrect text.

11. A non-transitory computer-readable storage medium storing a computer program executed by one or more processors, wherein the computer program causes the one or more processors to perform operations for speech recognition, the operations comprising:
    obtaining first text information for voice information by performing first speech recognition on the voice information;
    receiving feedback regarding the first text information; and
    generating final text information for the voice information based on the received feedback,
    wherein the first speech recognition includes real-time speech recognition, and is performed through a first neural network model that is a Real-Time Speech-To-Text (RT-STT) neural network model including a transducer structure,
    wherein the feedback regarding the first text information includes at least one of: feedback on a correct text of the first text information and feedback on an incorrect text of the first text information,
    wherein the generating of the final text information for the voice information includes:
        generating the final text information by performing second speech recognition on the voice information when the received feedback is an incorrect feedback,
    and wherein the second speech recognition is performed by a second neural network model that is a Speech-To-Text (STT) neural network model including an encoder and decoder structure.

12. A computing device, comprising:
    at least one processor; and
    a memory,
    wherein said at least one processor:
        obtains first text information for voice information by performing first speech recognition on the voice information,
        receives feedback regarding the first text information, and
        generates final text information on the voice information based on the received feedback,
    wherein the first speech recognition includes real-time speech recognition and is performed through a first neural network model that is a Real-Time Speech-To-Text (RT-STT) neural network model including a transducer structure,
    wherein the feedback regarding the first text information includes at least one of: feedback on a correct text of the first text information and feedback on an incorrect text of the first text information,
    wherein the generating of the final text information for the voice information includes:
        generating the final text information by performing second speech recognition on the voice information when the received feedback is an incorrect feedback,
    and wherein the second speech recognition is performed by a second neural network model that is a Speech-To-Text (STT) neural network model including an encoder and decoder structure.

\* \* \* \* \*

UNITED STATES PATENT AND TRADEMARK OFFICE
CERTIFICATE OF CORRECTION

PATENT NO. : 11,657,803 B1  
APPLICATION NO. : 17/979709  
DATED : May 23, 2023  
INVENTOR(S) : Hyungwoo Kim et al.

Page 1 of 1

It is certified that error appears in the above-identified patent and that said Letters Patent is hereby corrected as shown below:

On the Title Page

Below Item (22) insert -- (30) Foreign Application Priority Data  
Jul. 15, 2022 (KR) ............................................. 10-2022-0087494 --.

Signed and Sealed this  
Twenty-ninth Day of October, 2024

Katherine Kelly Vidal  
*Director of the United States Patent and Trademark Office*